United States Patent
Cosserat et al.

(10) Patent No.: US 11,095,471 B2
(45) Date of Patent: Aug. 17, 2021

(54) HOME-AUTOMATION SYSTEM AND METHOD FOR CONSTITUTING THE TOPOLOGY OF A HOME-AUTOMATION SYSTEM

(71) Applicant: SOMFY SAS, Cluses (FR)

(72) Inventors: Hubert Cosserat, Vertaz Monthoux (FR); Florent Michel, Gourdon (FR)

(73) Assignee: SOMFY SAS, Cluses (FR)

( * ) Notice: Subject to any disclaimer, the term of this patent is extended or adjusted under 35 U.S.C. 154(b) by 338 days.

(21) Appl. No.: 15/740,689

(22) PCT Filed: Jun. 30, 2016

(86) PCT No.: PCT/FR2016/051637
§ 371 (c)(1),
(2) Date: May 29, 2018

(87) PCT Pub. No.: WO2017/006024
PCT Pub. Date: Jan. 12, 2017

(65) Prior Publication Data
US 2018/0294989 A1 Oct. 11, 2018

(30) Foreign Application Priority Data

Jul. 3, 2015 (FR) ...................................... 15 56298

(51) Int. Cl.
*H04L 12/28* (2006.01)
*H04L 12/24* (2006.01)
(Continued)

(52) U.S. Cl.
CPC .......... *H04L 12/282* (2013.01); *G06F 3/0482* (2013.01); *G08C 17/02* (2013.01);
(Continued)

(58) Field of Classification Search
CPC ... H04L 12/282; H04L 12/2821; H04L 41/22; H04L 12/2816; H04L 12/2838;
(Continued)

(56) References Cited

U.S. PATENT DOCUMENTS 5,500,934 A 3/1996 Austin et al.
8,374,104 B2 2/2013 Gauweiler et al.
(Continued)

OTHER PUBLICATIONS

International Search Report for International Application No. PCT/FR2016/051637 dated Oct. 31, 2016 (2 pgs).
(Continued)

*Primary Examiner* — Abdullahi E Salad
(74) *Attorney, Agent, or Firm* — Cantor Colburn LLP (57) ABSTRACT

The invention relates to a home-automation system and a method for constituting the topology of a home-automation system comprising a plurality of central control units, the method being executed by a user terminal (T) connected to the at least one home-automation system and comprising the following steps: receiving (ECTT3, ECTT4) from at least one central control unit (U1, U2) among the plurality of central control units (U1, U2) at least one message (MDL1, MDL2) comprising a list (DL1, DL2) comprising at least one home-automation device with which said central control unit is capable of communicating; selecting (ECTT6) at least one combination of at least one device in connection with one central control unit among the plurality of control units (U1, U2) for which the communicated device list (DL) comprises the selected device, with a view to connecting at least one device to said central control unit; and sending (ECTT7) a connection message (MR) to the at least one central control unit (U) selected in step ii so as to trigger a connection of the at least one device (D) to said central control unit (U).

18 Claims, 6 Drawing Sheets

(51) Int. Cl.
  *G06F 3/0482* (2013.01)
  *G08C 17/02* (2006.01)
  *H05B 47/19* (2020.01)

(52) U.S. Cl.
  CPC ...... *H04L 12/2816* (2013.01); *H04L 12/2821* (2013.01); *H04L 12/2838* (2013.01); *H04L 41/22* (2013.01); *H05B 47/19* (2020.01); *G08C 2201/41* (2013.01); *G08C 2201/93* (2013.01); *H04L 2012/285* (2013.01)

(58) Field of Classification Search
  CPC ........... H04L 2012/285; H04L 12/2807; G06F 3/0482; G08C 17/02; G08C 2201/41; G08C 2201/93; H05B 47/19; H05B 47/10; H04W 8/005; H04W 76/10; H04W 60/00
  See application file for complete search history.

(56) References Cited

U.S. PATENT DOCUMENTS

| | | | |
|---|---|---|---|
| 8,548,607 B1* | 10/2013 | Belz | G05B 15/02 700/21 |
| 8,825,832 B2 | 9/2014 | Whipple et al. | |
| 9,661,674 B2 | 5/2017 | Su | |
| 9,898,175 B2 | 2/2018 | Fiedler | |
| 2002/0013150 A1 | 1/2002 | McKenna et al. | |
| 2002/0198951 A1 | 12/2002 | Thurlow et al. | |
| 2005/0005242 A1 | 1/2005 | Hoyle | |
| 2005/0021852 A1 | 1/2005 | Accarie et al. | |
| 2005/0044225 A1 | 2/2005 | Ota et al. | |
| 2005/0055108 A1* | 3/2005 | Gonzales | H04L 12/2803 700/22 |
| 2005/0130611 A1 | 6/2005 | Lu et al. | |
| 2005/0198261 A1 | 9/2005 | Durvasula et al. | |
| 2005/0258976 A1* | 11/2005 | Zteng | G08C 17/02 340/13.24 |
| 2006/0133392 A1* | 6/2006 | Ajitomi | H04L 61/1541 370/401 |
| 2007/0104164 A1 | 5/2007 | Laroia et al. | |
| 2007/0140168 A1 | 6/2007 | Laroia et al. | |
| 2007/0158335 A1 | 7/2007 | Mansbery | |
| 2007/0208782 A1 | 9/2007 | Carter et al. | |
| 2007/0258718 A1 | 11/2007 | Furlong et al. | |
| 2008/0113665 A1 | 5/2008 | Paas et al. | |
| 2008/0281971 A1 | 11/2008 | Leppanen et al. | |
| 2009/0094317 A1 | 4/2009 | Venkitaraman | |
| 2009/0117848 A1 | 5/2009 | Nagata et al. | |
| 2009/0217335 A1 | 8/2009 | Wong et al. | |
| 2009/0287529 A1 | 11/2009 | Johnson | |
| 2010/0146396 A1 | 6/2010 | Able et al. | |
| 2010/0332994 A1 | 12/2010 | Istvan et al. | |
| 2011/0184561 A1 | 7/2011 | Klasson et al. | |
| 2011/0280175 A1 | 11/2011 | Yamada et al. | |
| 2012/0002589 A1 | 1/2012 | Saifullah et al. | |
| 2012/0088525 A1 | 4/2012 | Kurokawa et al. | |
| 2012/0235579 A1* | 9/2012 | Chemel | H05B 47/19 315/152 |
| 2012/0296451 A1* | 11/2012 | Kaps | H04L 67/12 700/83 |
| 2012/0312874 A1 | 12/2012 | Jonsson | |
| 2012/0331156 A1 | 12/2012 | Colpitts et al. | |
| 2013/0215116 A1 | 8/2013 | Siddique et al. | |
| 2013/0286892 A1 | 10/2013 | Fuste Vilella et al. | |
| 2013/0337769 A1 | 12/2013 | Bhatia et al. | |
| 2014/0040435 A1 | 2/2014 | Ylimartimo | |
| 2014/0064209 A1 | 3/2014 | Anchan et al. | |
| 2014/0153489 A1 | 6/2014 | Perras et al. | |
| 2014/0159879 A1 | 6/2014 | Rezvani et al. | |
| 2014/0172176 A1 | 6/2014 | Deilmann et al. | |
| 2015/0012463 A1 | 1/2015 | Rosenthal | |
| 2015/0048162 A1 | 2/2015 | Jonsson | |
| 2015/0156031 A1* | 6/2015 | Fadell | G08B 19/005 700/276 |
| 2015/0163119 A1 | 6/2015 | Dupre et al. | |
| 2015/0200787 A1* | 7/2015 | Slupik | H04Q 9/00 700/275 |
| 2015/0208454 A1 | 7/2015 | Cho et al. | |
| 2016/0021502 A1 | 1/2016 | Kim et al. | |
| 2016/0061132 A1 | 3/2016 | Hieda | |
| 2016/0072781 A1 | 3/2016 | Zhang et al. | |
| 2016/0073274 A1 | 3/2016 | Burley | |
| 2016/0080232 A1 | 3/2016 | Dupre et al. | |
| 2016/0098309 A1 | 4/2016 | Kim | |
| 2016/0098468 A1 | 4/2016 | Logue et al. | |
| 2016/0099826 A1 | 4/2016 | Logue et al. | |
| 2016/0099830 A1 | 4/2016 | Stellick | |
| 2016/0099866 A1 | 4/2016 | Stellick | |
| 2016/0100305 A1 | 4/2016 | Karampatsis et al. | |
| 2016/0112870 A1 | 4/2016 | Pathuri | |
| 2016/0165663 A1 | 6/2016 | Shanmugam et al. | |
| 2016/0227471 A1 | 8/2016 | De Foy et al. | |
| 2016/0262200 A1 | 9/2016 | Su | |
| 2017/0079086 A1* | 3/2017 | Kuge | H04W 24/08 |
| 2017/0332288 A1 | 11/2017 | Sadek et al. | |
| 2018/0091391 A1 | 3/2018 | Turow et al. | |
| 2018/0270075 A1 | 9/2018 | Cosserat et al. | |
| 2018/0287813 A1 | 10/2018 | Cosserat et al. | |
| 2020/0020353 A1 | 1/2020 | Levy-Rosenthal | |

OTHER PUBLICATIONS

International Search Report for International Application No. PCT/FR2016/051634 dated Oct. 31, 2016.
International Search Report for International Application No. PCT/FR2016/051632 dated Sep. 28, 2016.
Written Opinion for International Application No. PCT/FR2016/051634 dated Oct. 31, 2016.
Written Opinion for International Application No. PCT/FR2016/051632 dated Sep. 28, 2016.
Written Opinion for International Application No. PCT/FR2016/051637 dated Oct. 31, 2016.
U.S. Final Office Action for U.S. Appl. No. 15/740,699; dated Jun. 9, 2020.
U.S. Office Action for U.S. Appl. No. 15/740,699; dated Oct. 28, 2020.
Non-Final Office Action for U.S. Appl. No. 15/740,694: dated Dec. 31, 2020.
Notice of Allowance for U.S. Appl. No. 15/740,699: dated Mar. 10, 2021.

* cited by examiner

HOME-AUTOMATION SYSTEM AND METHOD FOR CONSTITUTING THE TOPOLOGY OF A HOME-AUTOMATION SYSTEM

CROSS REFERENCE TO RELATED APPLICATIONS

This application is a National Stage of PCT Application No. PCT/FR2016/051637 filed on Jun. 30, 2016, which claims priority to French Patent Application No. 15/56298 filed on Jul. 3, 2015, the contents each of which are incorporated herein by reference thereto.

TECHNICAL FIELD

The present invention concerns a method for constituting the topology of a home automation installation and a home automation installation.

BACKGROUND

A home automation installation of a building may comprise a plurality of home automation devices. It is known to proceed to the configuration, the control and/or the supervision of said installation by using a central control unit which communicates with one or more home automation device(s).

In the case of large buildings, it may be necessary either to use repeaters or to proceed to the installation of several central units in order to allow access to all home automation devices that are part of the installation. Moreover, in the case of disparate home automation installations, wherein many types of home automation devices must be monitored, it may also be desirable to use several central control units that allow communicating in the different communication protocols used by the home automation devices.

If the presence of these different units allows communicating with all the devices, the architecture thus constituted is complex to master for a user.

BRIEF SUMMARY

The present invention aims to solve all or part of the drawbacks mentioned hereinabove.

For this purpose, the present invention concerns a method for constituting the topology of a home automation installation comprising a plurality of central control units, the method being executed by a user terminal connected to the at least one home automation installation and comprising the following steps:

i. Receiving from at least one central control unit among the plurality of central control units at least one message comprising a list comprising at least one home automation device with which said central control unit is likely to communicate.

ii. Selecting at least one combination of at least one device in connection with a central control unit from the plurality of control units for which the communicated device list comprises the selected device, with the aim of attaching at least one device to said central control unit iii. Sending an attachment message to the at least one central control unit selected in step ii so as to trigger an attachment of the at least one device to said central control unit.

Thanks to the arrangements of the invention, it is possible to use several central control units within a single installation in order to extend the number of types of home automation devices or the number of home automation protocols that can be used in the same installation, or to increase the total number of devices of the installation, while preserving an identification of belonging of the different home automation devices to the same installation.

It should be noted that the term home automation device means a home automation equipment and/or a sensor, or part of a home automation equipment or part of a sensor corresponding to a functional subset.

Moreover, message means a piece of information notified or received in the form of a synchronous or asynchronous call, which may also correspond to a local or remote function call.

Installation means a set comprising a plurality of home automation devices and a plurality of control units disposed in a single building or over a plurality of locations, each home automation device being linked to an electronic control unit among the plurality of electronic control units, the plurality of electronic control units forming a group under the monitoring of a user. The electronic devices form groups of at least one home automation device attached to an electronic control unit.

The same device or the same control unit may belong to two different installations under the responsibility of two different users. For example, a home automation device corresponding to a heating system can be comprised in a first home automation installation comprising a set of devices comprised in a housing, under the monitoring of a user occupying the housing, and in a second home automation installation comprising a set of home automation devices corresponding to heating systems disposed in a plurality of housings under the monitoring of an administrator user of the heating equipment for the plurality of housings.

Central control unit of the home automation installation means an electronic unit comprising at least one processing unit to contain and execute at least one computer program, comprising at least one communication module intended to monitor and/or control at least one home automation device and at least one communication module with the management unit. The electronic unit can be independent or integrated into a home automation device. In the latter case, the communication module intended to monitor and/or control the device can be a communication module internal to the home automation device and/or a communication module intended to monitor and/or control other home automation devices. In some applications, a central control unit can communicate with the management unit via an intermediate management unit, for example a third-party service provider, whose intermediate management unit provides a service interface or API.

According to one aspect of the invention, the management unit is a server remotely connected to the at least one home automation installation, via a wide area network.

According to another aspect of the invention, the management unit is a central unit intended to be linked to one or more central control unit(s) on separate private or local area networks, or on the same local area network.

According to one aspect of the invention, the selection step is carried out by receiving an attachment instruction from the user or a control message concerning an attachment of at least one home automation device to at least one central control unit.

According to these arrangements, the attachment is defined manually by the user.

According to one aspect of the invention, the attachment instruction corresponds to an order or an action on a home automation device.

According to these arrangements, the attachment is defined manually by the user, by performing actions on a control device, such as for example pressing a dedicated button, sending an io/RTS message with a local control point.

According to one aspect of the invention, the attachment instruction is defined by an instruction communicated via a user interface of the terminal or of an application executed on the user terminal.

According to these arrangements, the attachment of the home automation devices to the central control units can be performed by a user interface of a user terminal. The user can select the devices to be attached to a given central control unit according to a criterion of proximity between said device and the central control unit, in order for example to limit the power of the signals during transmissions. Another criterion may be the location of the devices in the same room or the same floor. The specific action that must be executed by the user allows making an unambiguous selection of the actuators.

According to one aspect of the invention, the instruction communicated via the user interface corresponds to a selection in said at least one list of home automation devices.

According to these arrangements, the definition of the attachment of a home automation device to a central control unit is defined by a selection by the user via a user interface. Particularly, each central control unit sends a list of the home automation devices with which it is likely to communicate, for example the devices within its radiofrequency communication range in the case of a radio frequency communication, and the user can make a selection in this list to attach a subset or the whole list to the central control unit.

According to one aspect of the invention, the list is communicated together with at least one information relating to the quality of the communication between a central control unit and the concerned home automation device.

The information relating to the quality of the communication may correspond, for example, to the power of the signal received by a device from the central unit, which allows guiding the choice of the user.

According to one aspect of the invention, the selection step is carried out according to at least one selection criterion taking into account a relative location, a function comparison and/or the communication quality between said home automation device and said central control unit.

According to one aspect of the invention, the at least one list is communicated in association with at least one descriptive information relating to the quality of the communication between a central control unit and the concerned home automation device and/or an information concerning the function or the location of the home automation device, the at least one selection criterion being evaluated according to the at least one descriptive information.

According to one aspect of the invention, the selection criterion is evaluated by an approximation of the at least one descriptive information relating to the function or the location of the home automation device and of an information defining the location or the function of the central control unit.

Thanks to the arrangements of the invention, location or function information may be used to define the attachment. For example, a central control unit may be defined as responsible for the "garage" type devices, in this case a device of the type garage door actuator will be attached to said central control unit.

According to one aspect of the invention, the selection criterion is evaluated according to a descriptive information relating to a communication quality between a central control unit and the concerned home automation device, a home automation device being attached to a central control unit from which it receives a communication with the best communication quality.

According to one aspect of the invention, the quality of the communication is defined by the power of the signal received by the central control unit coming from a device. For example, it is possible to provide that a device is attached to a central control unit that receives its signals with the highest receiving level.

The present invention also concerns a computer program product comprising code instructions arranged to implement the steps of a method as described above, when said program is executed by a processor of a user terminal.

The present invention also concerns a home automation installation comprising at least a first central control unit and a second central control unit, each central control unit comprising at least a first communication module intended for communication, according to a first local protocol for the first central control unit and according to a second local protocol for the second central control unit, with the aim of monitoring and/or controlling home automation devices, a second communication module with a management unit accessible via a wide area network and a third communication module for communication according to a third local protocol with a mobile communication terminal, the installation further comprising a plurality of home automation devices comprising a first group of home automation devices comprising at least one home automation device attached to the first central control unit and a second group attached to the second central control unit.

According to one aspect of the invention, the central control units do not communicate with each other, even if they can be connected individually to the same management unit. These arrangements allow a modularity of the installation. Thus, during the integration of the system, the addition/removal/modification of a central control unit does not disturb the others. Moreover, in the case of different local communication protocols used by the central control units, it is not necessary to provide a gateway between said local protocols.

According to one aspect of the invention, the first local communication protocol is identical to the second local communication protocol. According to another aspect, the first local protocol is distinct from the second local communication protocol.

According to one aspect of the invention, the installation comprises a mobile communication terminal connected to the first central control unit and a second central control unit, the terminal comprising a user interface arranged to group together at least the representations of the devices contained in the first group of home automation devices comprising at least one home automation device attached to the first central control unit and the second group attached to the second central control unit into a group of devices attached to the installation or to a representative entity of the installation.

The different aspects defined above that are not incompatible can be combined.

BRIEF DESCRIPTION OF THE DRAWINGS

The invention will be better understood using the detailed description exposed below with reference to the appended drawings wherein.

DETAILED DESCRIPTION

In the following detailed description of the Figures defined above, the same elements or the elements fulfilling identical functions may preserve the same references in order to simplify the understanding of the invention.

Figure 1:
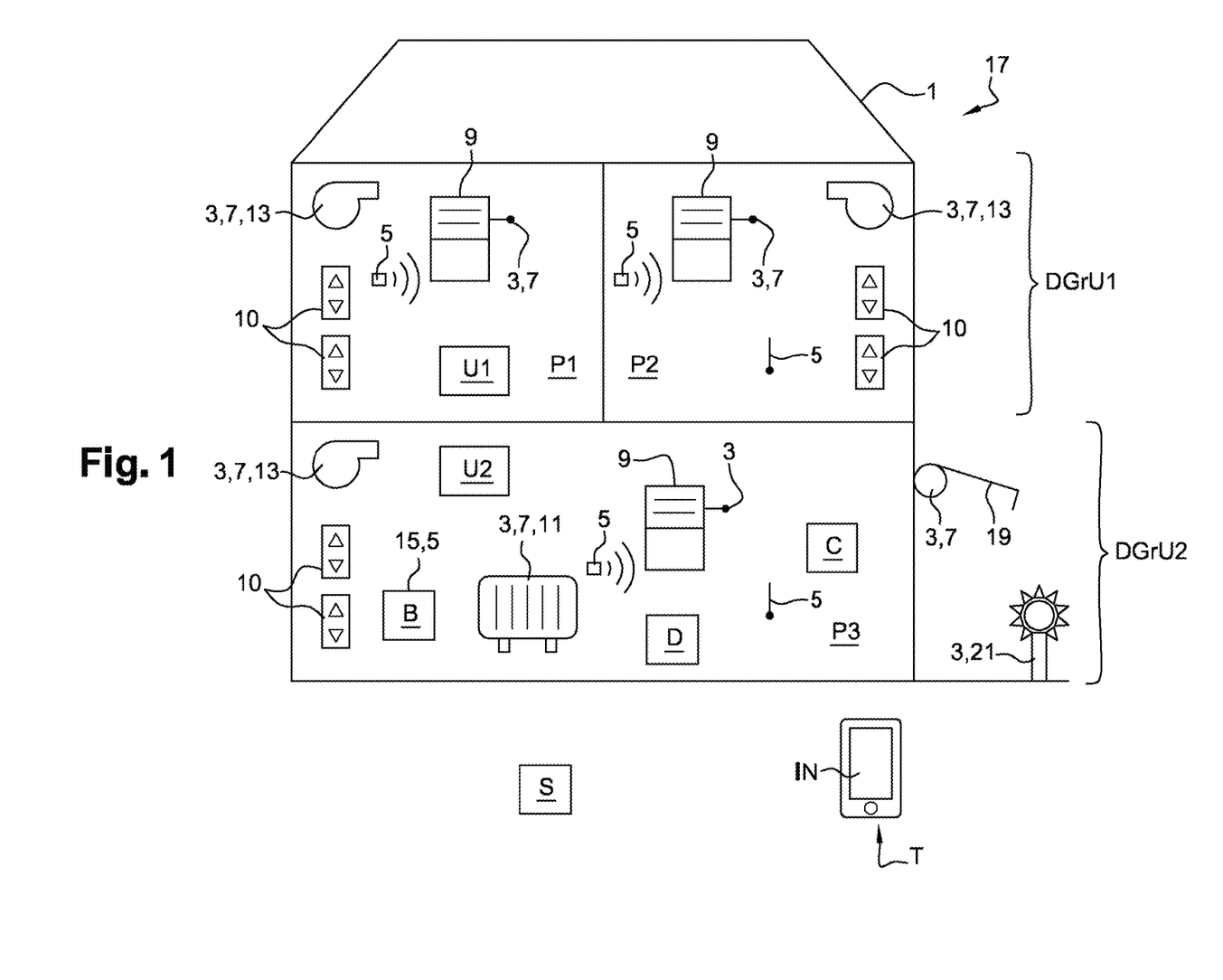
FIG. 1 is a schematic view of a building and of a home automation installation in accordance with an embodiment of the invention.

As illustrated in FIG. 1, a building 1 comprises for example, three rooms P1, P2, P3. The building 1 also comprises home automation equipment 3 and sensors 5.

A home automation equipment 3 can be an actuator arranged to move or adjust an element of the building 1, for example an actuator 7 to move a roller shutter 9 or a terrace awning 19, or a regulation system 10 for a heater 11 or an aeraulic system 13. A home automation equipment 3 may also be a lighting, for example a terrace outdoor lighting 21 or a lighting control system, an alarm system, or a video camera, particularly a video surveillance camera.

The home automation installation 17 may also comprise a control point 15 of an actuator 7, such as a wireless control box B for the roller shutter 9.

The home automation installation 17 may comprise one or several sensor(s) 5, integrally to an actuator 7, a control point 15 or the control box B, or independently of these elements. A sensor 5 may, in particular, be arranged to measure a physical quantity, for example a temperature sensor, a sunlight sensor or a humidity sensor. Home automation equipment 3 position sensors 5 of the building 1 such as, for example, sensors for the open state of a roller shutter 9 or position sensors of a door leaf such as a window, motorized or not, may also be provided. The home automation installation may also comprise one or more presence sensor(s).

A home automation equipment 3 and a sensor 5 are thus to be considered as units having available information on observed actual states of the building 1 elements and being able to share this information with other elements of the home automation installation 17.

The home automation equipment 3 and the sensors 5 can thus have access to any measurable physical quantity, such as the temperature of each room P1, P2, P3 or a state of a building 1 element, such as the open state of a roller shutter 9, the status of an alarm, etc.

Subsequently, we will use the designation of home automation device or device D indifferently to designate sensors or home automation equipment, or parts of home automation equipment 3 or sensors 5.

The home automation installation 17 comprises a plurality of central control units U1, U2. Particularly and for example, two central control units U1, U2 are shown in FIG. 1.

Each central control unit U1, U2 is arranged to control and/or monitor part of the devices D of the installation 17 forming a group DGrU1, DGrU2. For example, in FIG. 1, the central control unit U1 is in charge of the devices D disposed in the rooms P1 and P2 of the first floor of the building, while the central control unit U2 is in charge of the devices D disposed in the room P3 on the ground floor of the building and of the outdoor devices.

Particularly, the control and/or the monitoring is carried out remotely, in particular by using a wireless communication protocol, for example a radio communication protocol. Each central control unit U1, U2 is arranged to group together all the data coming from the devices D of its group DGrU1, DGrU2 and to process these data.

The devices D that are part of a group DGrU1, DGrU2 belong to a local area network managed by a central control unit U1 or U2 within the home automation installation and communicate according to a local communication protocol with the central control unit U1 or U2. They have a local address in this network. The logical devices D can be modeled as end nodes or endpoints in the local area network.

The local addressing system may be hierarchical or flat, the address format may be numerical or alphanumerical.

Figure 2:
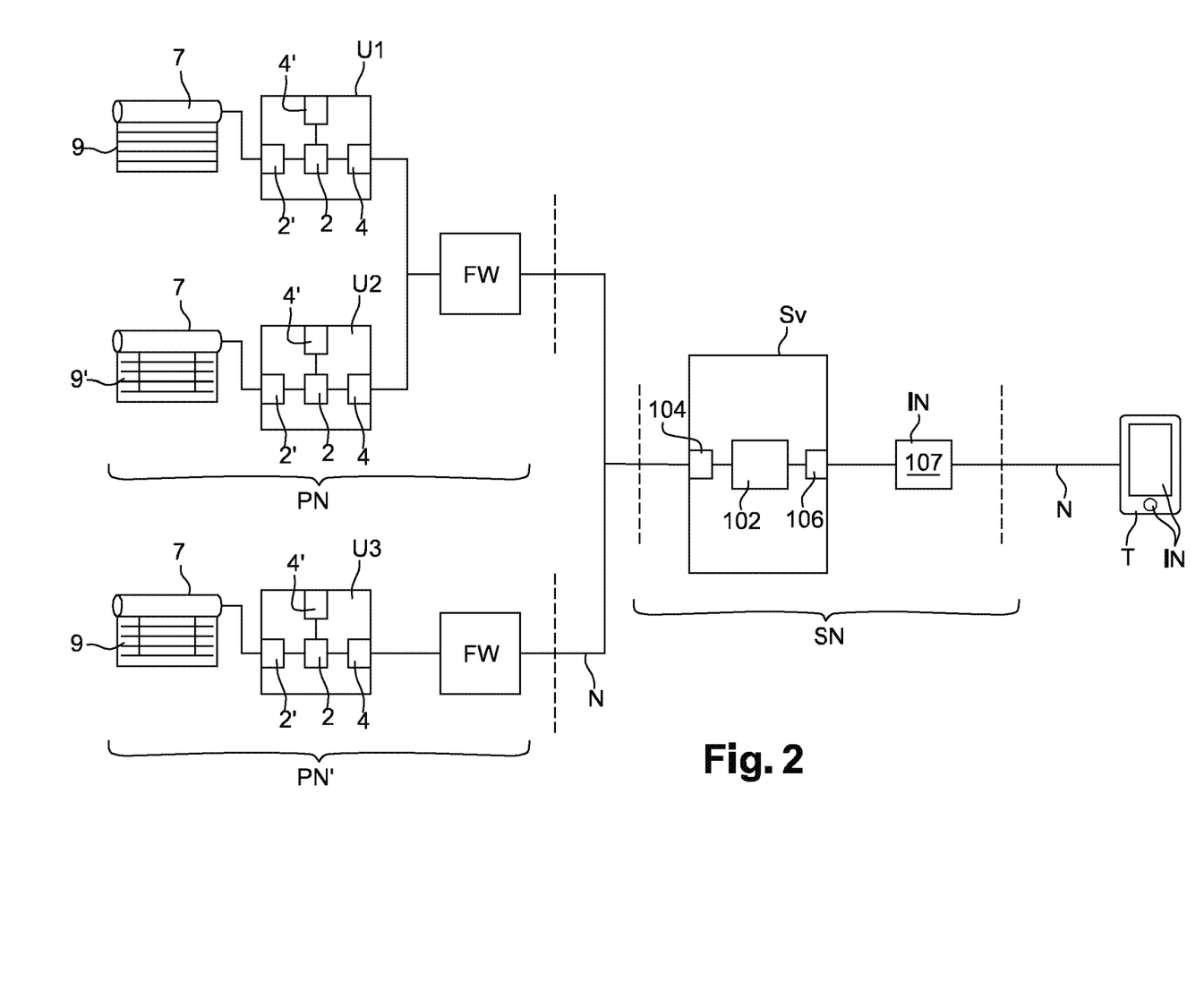
FIG. 2 is a diagram showing an architecture of a system comprising the home automation installation illustrated in FIG. 1 as well as a server intended to be connected to a user terminal.

As shown in FIG. 2, each control central unit U is arranged to communicate with a server Sv.

The central control units U1, U2, U3 are disposed on a private network PN, PN', whose access is generally protected by a firewall FW. Particularly, in the example shown in FIG. 2, two central control units U1, U2, are disposed on a first private network corresponding to a first home automation installation, while a third central control unit U3 is disposed on a second private network PN' independent of the private network PN corresponding to a second home automation installation. The server Sv is also disposed on a private network SN. The private network PN is linked to a wide area network N, for example Internet. Of course, the server Sv is arranged to communicate with a set of such central control units U. One of these units later will be described afterwards.

A central control unit U comprises a processing unit 2 arranged to contain and execute a first computer program. For example, the processing unit 2 comprises a processor, a storage flash memory and a random-access memory, and an Ethernet chip.

The central control unit U further comprises at least one communication module 2' intended to monitor and/or control home automation equipment 3 and/or sensors 5, the home automation equipment 3 may be actuators 7, lights 21, an alarm system or a video camera.

For example, as shown in FIG. 2, the communication module 2' allows monitoring and controlling at least one actuator 7, a mobile element of the building 1, for example a roller shutter 9, or an orientable sunshade 9' or other actuators 7 or lights 21, as previously described with reference to FIG. 1.

For example, the communication module 2' can be arranged to implement for example one or more protocol(s)

Z-Wave, EnOcean, IO Homecontrol, somfy RTS, KNX, MODBUS, Wavenis, Philips HUE.

According to another possibility, for example under alarm systems, the central control unit can be integrated into the home automation device.

Receiving information from a sensor 5 providing a user with presence information or values of the surrounding parameters, such as temperature, humidity, and brightness, is also provided. In the same way, the central unit U can allow monitoring and/or controlling an alarm system.

Each central control unit U further comprises a communication module 4 with the server Sv. The server Sv allows the remote control and/or monitoring and comprises one or more processing unit(s) 102 arranged to contain and execute a second computer program.

Each central control unit U further comprises a communication module 4' to communicate according to a local communication protocol, for example Bluetooth or Wi-Fi, with a mobile communication terminal T. The communication terminal T can contain and execute an application software APP.

In some applications, a central control unit U can communicate with the management unit via an intermediate server, for example a third-party service provider, whose intermediate server offers a service interface or API. The server Sv comprises, for its part, at least one communication interface 104 intended for the communication with the central unit U.

The server Sv may also comprise a communication interface 106 intended for the communication with a control and/or monitoring interface IN allowing a user to remotely monitor the home automation installation.

It should be noted that the term server is a logical designation that can cover the use of multiple physical servers to distribute the computer processing load to achieve.

The control and/or monitoring interface IN comprises, for example, a web server 107 and a mobile communication terminal T communicating by the wide area network N. The mobile communication terminal T may be, for example, a smartphone or a tablet. The mobile communication terminal T may be the same or a terminal of the same type as the one with which the central control unit U communicates locally by means of the communication module 4', or a different terminal. These mobile terminals will be designated indifferently by the reference T.

The control and/or monitoring interface IN comprises a processor that can be disposed at the web server 107 and/or the mobile communication terminal T.

The processor of the control and/or monitoring interface IN is arranged to use a third computer program. This third computer program is in turn arranged to execute a downloadable application.

The mobile communication terminal T comprises a data input device and a display device, for example in the form of a part of a touch control of a screen of the terminal T and in the form of one or more button(s) of the terminal T.

FIGS. 1 and 2 describe an installation 17 which comprises a set of devices D and a plurality of central control units U1, U2, disposed in the same housing, the same building or the same physical location.

According to another possibility, an installation 17 within the meaning of the invention may comprise home automation devices disposed over a plurality of premises, with at least one central control unit over each of these premises to which the home automation devices are attached, the central control units U of the installation being placed under the monitoring of a user.

For example, such an installation may comprise a set of home automation devices constituted of heating systems distributed in a set of housings or tertiary premises, attached to a set of central control units U, the set of home automation devices being intended to be controlled by a specific user in charge of heating for said set of housings or tertiary premises.

Figure 3:
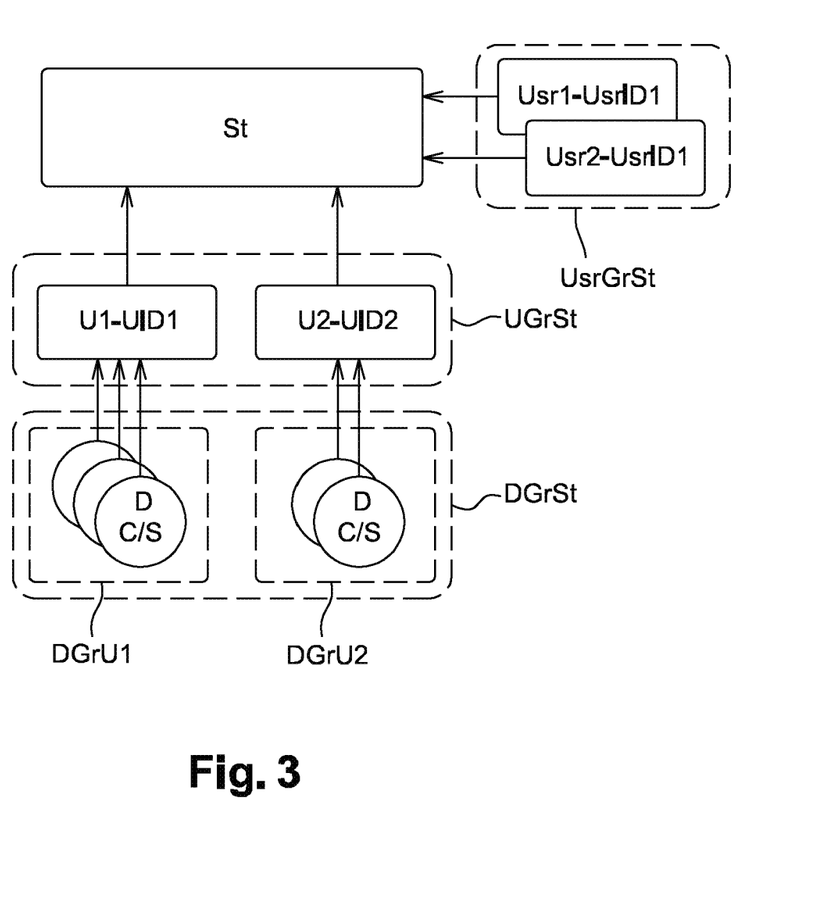
FIG. 3 is a diagram showing the relations between a representative entity of a home automation installation, the central control units and the devices of the home automation installation.

The representation of the installation 17 by a representative entity St on the server Sv will now be described with reference to FIG. 3, in the case where the installation comprises multiple central control units U.

The system, according to the invention, attaches several central control units U to a single object St representing an installation 17 by a configuration at the server Sv.

The server Sv can thus present to the user the installation 17 as a single set of devices D to the user, for example via an Application Programming Interface or API, in which each device D can accept a given set of commands C or present state variables S.

The server Sv can also use an abstraction system or layer for the commands C and the state variables S to propose a more generic API independent of the communication protocol used by a given device D.

The identification of the representative entity St of the installation can be, according to an embodiment, carried out by any one of the identifiers UID of one of the central control units U present in the installation, by an identifier of the installation or of the user.

Thus, to simplify the designation of an installation in the public APIs, it is sufficient that the users of these APIs provide a unique identifier attached to the representative entity St of the installation 17.

Internally to the server, a unique identifier of the representative entity St of the installation 17 may exist to facilitate the implementation.

Thus, the representative entity St can be associated with a list or group of devices DGrSt grouping the devices contained in the different groups DGrU1, DGrU2 attached to each central control unit U1, U2 and to a group UGrSt of the identifiers UID of the concerned central control units U. The devices are identified by a unique identifier. A representative entity of a home automation installation may be associated with a given user Usr1, identified by an identifier UsrID, corresponding for example to a login and password combination, or with a given group of users UsrGrSt.

An example of embodiment of a unique identifier of a device DURL will now be described.

According to this embodiment, the unique identifier of a device DURL comprises information on:
  The local native protocol of the home automation device ID,
  The communication path toward the device D, including the intermediate central control units U and the termination addresses to cross, organized or not in a hierarchical topology;
  A subsystem identifier subsystemId if the device comprises several functional subsets or subsystems that can be addressed separately. The devices that comprise only one functional set do not have an identification extension of a subsystem.

Thus, the form of the unique identifier of a device DURL can be as follows:
  <protocol>://<gatewayId>/<rawDeviceAddress>(#<subsystemId>)

Wherein the following fields are present:

protocol: identifier of the native device local protocol;

gatewayId: identifier of the first central control unit U, for example a serial number or a unique identifier.

rawDeviceAddress: a simple or multi-level path. Its meaning and format depend on the addressing scheme of the local communication protocol of device D.

subsystemId: this optional field indicates an identification, for example a rank of the subsystem (starting for example at 1), if such a subsystem is present.

EXAMPLES 1. knx://0201-0001-1234/1.1.3

This unique identifier of a device DURL corresponds to a device D communicating by the protocol KNX with an individual address 1.1.3 accessible by the central control unit U carrying the identifier #0201-0001-1234.

2. io://0201-0001-1234/145036#2

This unique identifier of a device DURL corresponds to a subsystem carrying the number 2 associated with a device D communicating via the protocol io homecontrol with a radio address 145036 accessible by the central control unit U carrying the identifier #0201-0001-1234.

The manipulations of the data relating to the devices D at the server Sv are performed by an execution process or service ES. In order to store the data relating to the different device instances D mentioned above, the execution service may have access to an instance database IDB. Of course, these different types of instances can also be stored separately. Furthermore, database means here an appropriate storage mode for a set of instances, that can be stored in a list, a tree or tables or any other appropriate data structure.

Figure 4:
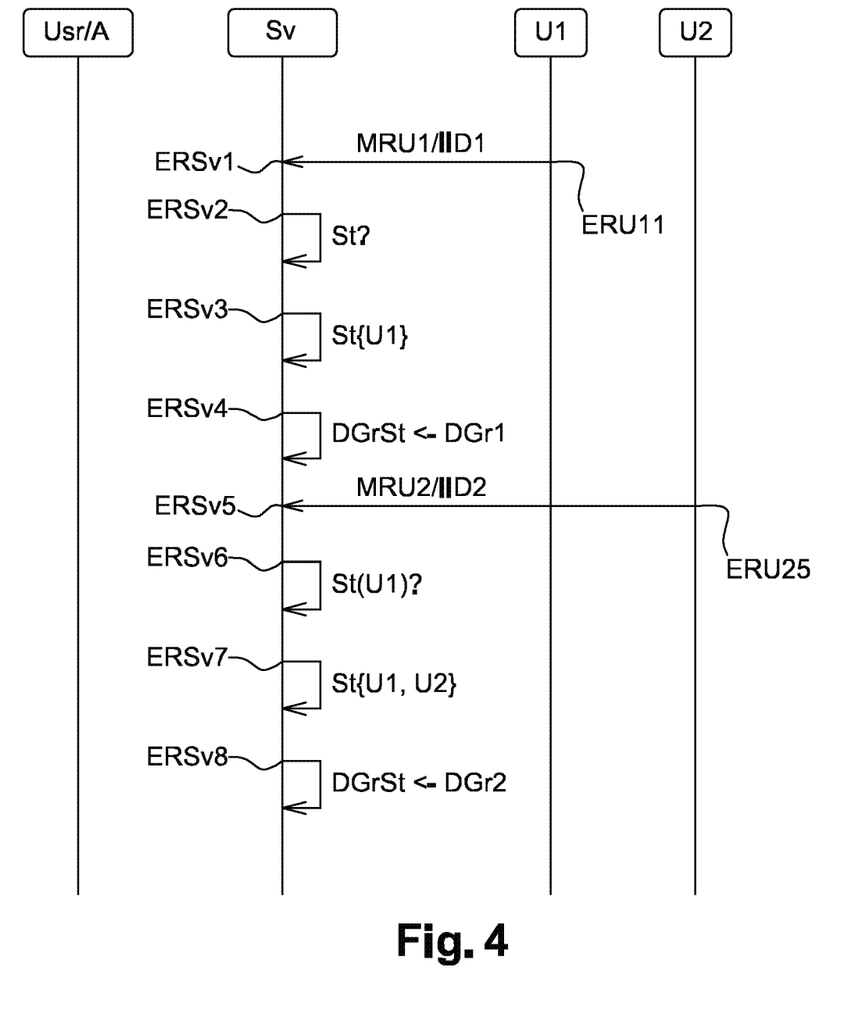
FIG. 4 is a diagram illustrating a mode of implementation of a method for registering a central control unit of a home automation installation with a management unit according to the invention.

A method for registering the central control units U will now be described with reference to FIG. 4, with a server Sv connected to the at least one home automation installation 17.

In a first step ERSv1, the server Sv receives at least one registering request message MRU1 from at least a first central control unit U1 for the installation 17, transmitted in a step ERU1 by a first central control unit U1, and/or by a user terminal T, based on an identification information IID1.

The identification information may correspond, for example, to an identifier of a central control unit already belonging to a representative entity, and/or to an identifier of the user UsrID under whose responsibility the registration is made and/or directly to an identifier of a representative entity of an installation. The identification information may be contained in the message or deduced from the context, for example from a transmission network address of the message, or from characteristics relating to the communication session.

In a second step ERSv2, the server obtains an attachment information StI1 from the first central control unit U1 to a representative entity St of a home automation installation 17. If the attachment information corresponds to an absence of attachment of the central control unit U1 to a previously registered installation 17, the server proceeds in a third step ERSv3 to the creation of a representative entity of the installation 17 and attaches the first central control unit U1 to this representative entity St. This is in particular the case when registering a first central control unit U1 of a given installation.

In the case where a central control unit U is already paired with one or more device(s) D of a group DGrU1, the representative entity St is updated in a fourth step ERSv4 to represent these devices in the group of devices DGrSt attached to the representative entity of the installation 17. Thus, the group of devices DGrSt is updated. The information needed to update the representative entity St may be present in the message MRU2, or may be subject to additional exchanges with the server Sv in order to obtain identification elements of the concerned devices D.

In a fifth step ERSv5, the server Sv receives at least one registering request message MRU2 from a second central control unit U2 for the installation 17, transmitted in a step ERU1 by a second central control unit U2, and/or by a user terminal T, based on an identification information IID2.

As seen previously, the identification information may correspond, for example, to an identifier of a central control unit already belonging to a representative entity, and/or to an identifier of the user UsrID under whose responsibility the registration is made, and/or to an identifier of the installation 17.

In a sixth step ERSv6, the server Sv obtains attachment information StI2 from the second central control unit U2 to a representative entity St of a home automation installation 17.

In a seventh step ERSv7, the server Sv attaches the second central control unit to a representative entity St of the installation 17 to which is also attached the first central control unit U1 for the same user UID1.

In the case where the central control unit U2 is already paired with one or more device(s) D of a group DGrU2, the representative entity St is updated in an eighth step ERSv8 to represent these devices in the group of devices DGrSt attached to the representative entity of the installation 17. Thus, the group of devices DGrSt is updated. The information necessary to update the representative entity may be present in the message MRU2, or may be the subject of additional exchanges between the server Sv in order to obtain identification elements of the concerned devices D.

Thus, the central control units U1 and U2 are considered as attached to the same representative entity St of an installation, which brings together all the devices D of the installation indifferently attached to the first or to the second central control unit in the same group DGrSt that can be communicated to a user terminal T. These arrangements are obtained without communication between the central control units, but simply by the logical attachment made upon registration.

The interface presented to the user can thus add an abstraction layer to hide the actual attachment of the devices to the central control units U. The interface represents thus the home automation equipment, such as shutters, awnings, HVAC or lighting systems, controllable in the installation as well as the present sensors.

If the devices D are thus attached to a representative entity of the installation, the information of attachment of the home automation devices D to the central control units U are however transmitted to the server Sv, for integration into the data structure, with the aim of routing the messages toward the concerned central control unit in the case of control by the Server Sv. Particularly, the identifier of the central control unit to which a product is attached can be contained in the identifier DURL.

A central control unit U can be detached from the representative entity St of an installation. When a central control unit U is detached, all the devices that are managed via the central control unit are removed from the group of devices DGrSt of the representative entity St of the installation 17. Thus, it is possible to provide that a central unit cannot be detached if the representative entity St comprises dependencies on the devices D managed by this central control unit U, as scenarios. These dependencies must be removed before the central control unit U can be detached.

In case of pairing of a new device D with a central control unit U, or on the contrary removal of a device, or in case of its modification, an update message is sent to the server Sv in order to also update the list of devices DGrSt dependent on the representative entity St.

Thanks to this registration method, the server Sv can therefore provide on the interface IN a description of the installation 17, thanks to the use of the representative entity in the form of a group of devices D, contained in the group of devices DGrSt, which have state variables S but also available commands C.

It is thus possible to control and monitor via the interface all the devices of the installation independently of their attachment to the central units U.

A first mode of implementation of a method for constituting the topology of at least one home automation installation 17 of a building 1 will now be described with reference to FIG. 5, in the case where a selection is made by a user, directly or via a third-party application. It will be assumed that the configuration method is carried out after the previously described registration method. Thus, the central control units U1 and U2 are attached to the representative entity St, and the devices D are identified in the group of devices DGrSt attached to the installation. It will be assumed here that the method is performed by a mobile user terminal, for example executing an application APP.

This terminal is connected in a prior step ECTT0 locally individually to the central control units U of the installation 17, by using a local protocol, such as a Bluetooth or Wi-Fi type protocol. The central control units U1 and U2 accept this connection respectively in steps ECTU01 and ECTU02. Terminal will be subsequently designated indifferently by the terminal or the application APP executed on this terminal T.

In a step ECTT1, a message MCT or a topology constitution instruction is received from, for example, a user or a third-party application that transmits or communicates this message or this instruction respectively in a step ECTUsr1 or ECTA1. The steps ECTT0 and ECTT1 can be switched, the connection can be established after receiving discovery instructions.

In a step ECTT2, the terminal can send a discovery message MCT to the plurality of central units U with which it is able to communicate, in order to request messages in return. It will be assumed in the present case that two central control units U1 and U2 are present in the installation and accessible to the terminal T.

Afterwards, in a first receiving step ECTT3, the terminal receives a first message MDL1 from a first control unit U1. The first message comprises a list DL1 comprising at least one home automation device D with which said central control unit U1 is likely to communicate.

In a second receiving step ECTT4, the terminal receives a second message MDL2 from a second control unit U2. The second message comprises a second list of devices DL2.

The lists DL1 and DL2 are communicated in association with at least one descriptive information DI1, DI2 relating to the quality of the communication between a central control unit and the concerned home automation device or an information concerning the function or the location of the home automation device.

It will be assumed here that the selection of the devices is a manual operation. Prior to this selection step, the terminal exposes the lists of devices with which the devices can communicate to a user or to a third-party application A in a step ECTT5. The third-party application A or the user Usr obtains these lists in a step ECTUsr5, respectively ECTA5.

Then, a selection step ECTUsr6 or ECTA6 is carried out by the user or a third-party application, wherein a selection of a combination between a device D and a central control unit U is defined in the list where the device D is present, in order to attach at least one device D to said central control unit U. The instruction MS communicated via the user interface and received by the terminal T in a step ECTT6 corresponds to a selection in said lists DL1, DL2 of home automation devices D indicating the attachments to be performed.

The user can select the devices D to be attached to a given central control unit according to a criterion of proximity between said device and the central control unit, in order for example to limit the power of the signals during transmissions. Another criterion may be the location of the devices in the same room or the same floor. The specific action that must be executed by the user allows making an unambiguous selection of the actuators.

This decision can be made based on the descriptive information DI1, DI2. Particularly, the location or function information may correspond to housing portions. For example, a central control unit may be defined as responsible for "garage" type devices, in this case a device of the type garage door actuator will be attached to said central control unit. The information relating to the quality of the communication may correspond, for example, to the power of the signal received by a device D coming from the central unit, which allows guiding the user's choice.

For example, it will be considered here that a device D is present in the list DL2 communicated by the central control unit U2, and that this device has been selected by the user for an attachment to the central control unit U2.

In a step ECCT7, a sending of an attachment message MR is made to a central control unit U selected in step ECTT5 in order to trigger an attachment of the at least one device D to said central control unit U. In the example shown in FIG. 5, the message MR is sent to the central control unit U2 which receives it in a step ECTU27.

Of course, the selection and sending steps can be repeated many times depending on the number of devices to be attached. For example, the same message MR may comprise a list of devices to be attached to a given central unit U.

According to one variant, the attachment instruction corresponds to an order or an action on a home automation device, for example by performing actions on a control device such as, for example, pressing a dedicated button, sending a message io/RTS with a local control point.

Figure 6:
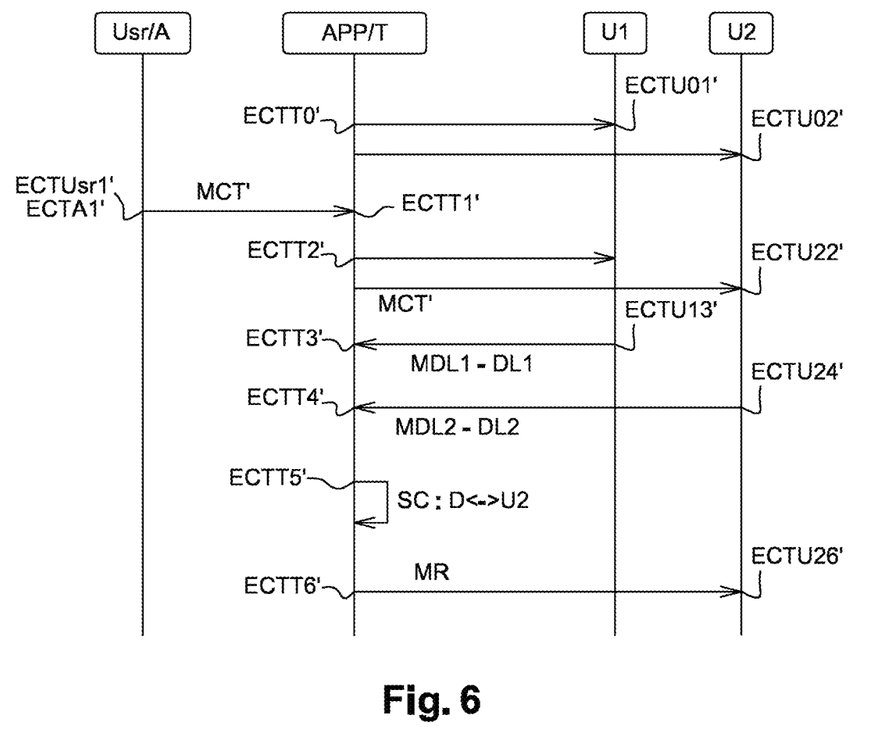
FIG. 6 is a diagram illustrating another mode of implementation of a method for constituting the topology of a home automation installation according to the invention.

A second mode of implementation of a method for constituting the topology of at least one home automation installation 17 of a building 1 will now be described with reference to FIG. 6, in the case where the selection of the devices is automated. It will be assumed, as before, that the method is performed by a mobile user terminal, for example executing an application APP.

Figure 5:
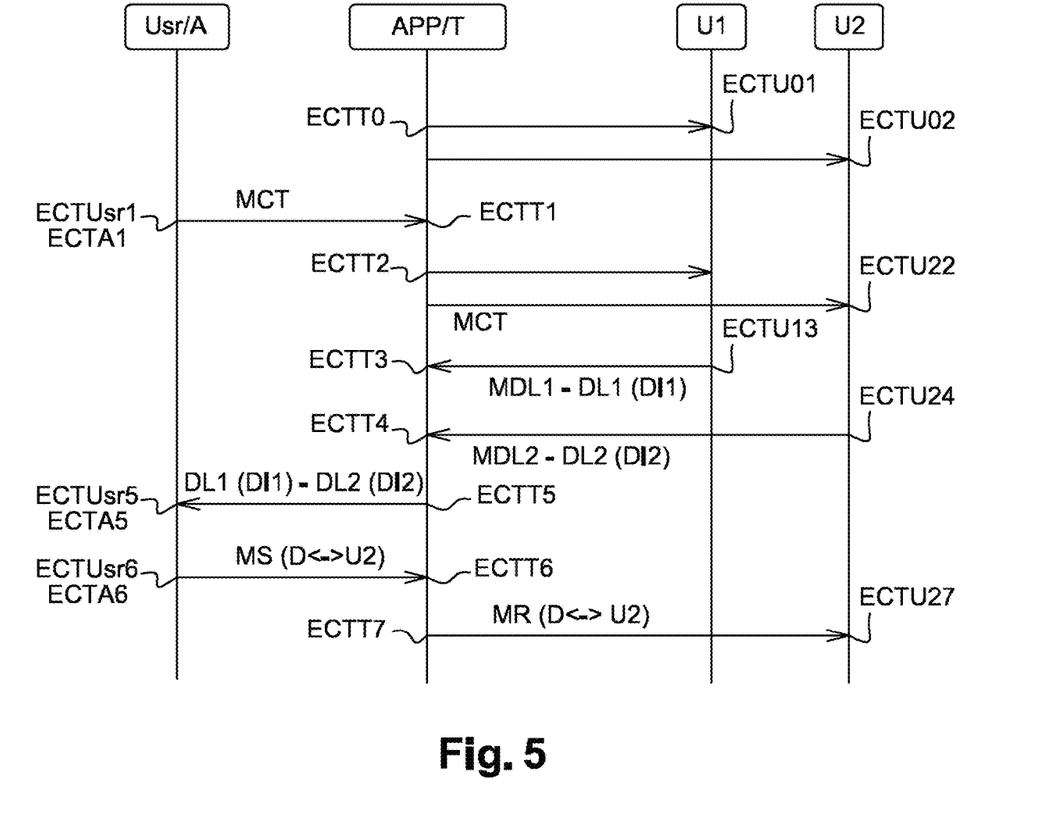
FIG. 5 is a diagram illustrating a mode of implementation of a method for constituting the topology of a home automation installation according to the invention.

The steps ECTT0' to ECTT4' of the method are similar to those described for the first mode of implementation of the method described in FIG. 5.

However, the following steps of the method are different. Thus, when receiving the lists DL1, DL2, an operation of automatic selection of the combinations between devices D and central control units U is carried out in a step ECTT5'.

The selection step is carried out according to at least one selection criterion SC taking into account the location, the function and/or the quality of communication between said home automation device and said central control unit U, this criterion being evaluated based on the descriptive information DI1, DI2 contained in the lists DL1, DL2.

According to a first possibility, the selection criterion CS may correspond to an approximation of the at least one descriptive information DI relating to the function or the location of the home automation device and one information defining the location or the function of the central control unit.

For example, a central control unit may be defined as responsible for the "garage" type devices, in this case, a device of the type garage door actuator will be attached to said central control unit.

According to another possibility, the selection criterion CS is a function of the quality of the communication between a central control unit and the concerned home automation device. Thus, for example, a home automation device can be attached to a central control unit with which it establishes a communication with the best quality of communication. The quality of the communication can be for example defined by the power of the signal received by the central control unit from a device. For example, it is possible to provide that a device is attached to a central control unit which receives its signals with the highest receiving level RSSI.

Of course, the selection criterion may take into account various parameters mentioned above as well as other relevant parameters that are not described.

For example, it will be considered here that a device D is present in the list DL2 communicated by the central control unit U2, and that this device has been selected by the application of the selection criterion CS for an attachment to the central control unit U2.

In a step ECCT6', a sending of an attachment message MR is made to a central control unit U selected in the step ECTT5 in order to trigger an attachment of the at least one device D to said central control unit U. In the example shown in FIG. 5, the message MR is sent to the central control unit U2 which receives it in a step ECTU26'.

Of course, the selection and sending steps can be repeated many times according to the number of devices to be attached. For example, the same message MR may comprise a list of devices to be attached to a given central unit U.

According to one aspect of the invention, the central control units may have communication modules using the same communication protocol, or distinct communication protocols. In this second case, the selection can be conditioned or determined entirely by the possibility of each central unit to communicate with given devices.

Thus, for example, if a central control unit U1 can communicate via a first communication protocol P1, for example of the type Zigbee, and if the second control unit U2 is able to communicate via a second different local communication protocol, for example of the type IO home-control, and if the installation comprises devices D communicating via the first or the second protocol only, the lists DL1 and DL2 will be exclusive of each other and the selection can be made by preserving the lists as they are.

Once the constitution of the topology is made, the user interface of the application APP executed on the terminal is arranged to group together at least the representations of the devices D contained in the first group DGrU1 of home automation devices D comprising at least one home automation device D attached to the first central control unit U1 and the second group DGrU2 attached to the second central control unit U2 into a group of devices DGrSt attached to the installation 17 or to a representative entity St of the installation.

The methods for registering and constituting the topology can be carried out in a successive or a nested way. Particularly, it is possible to register the central control units one by one, and to attach the accessible devices through it, which simplifies the selection step. It is also possible to relaunch a method for constituting the topology to reconfigure the attachments of devices to the central control units. It is also possible to execute first the method for constituting the topology for each central control unit, and subsequently to register in the representative entity St the identification and attachment information concerning the control units and the devices accessible through them.

The invention claimed is:

1. A method for constituting a topology of a home automation installation comprising a first central control unit and a second central control unit, the method being executed by a user terminal connected to the home automation installation and comprising the following steps:
   i. a first step of receiving from the first central control unit at least a first message comprising a first list comprising at least one home automation device with which the first central control unit is able to communicate and a second step of receiving from the second central control unit at least a second message comprising a second list comprising at least one home automation device with which the second central control unit is able to communicate;
   ii. selecting at least one combination of at least one device from the first list in connection with the first central control unit and at least one device from the second list in connection with the second central control unit,
   iii. for the at least one combination selected in step ii sending an attachment message to the first central control unit and the second central control unit, the attachment message sent to the first central control unit instructing the first central control unit to trigger an attachment of the at least one device from the first list to the first central control unit, and the attachment message sent to the second central control unit instructing the second central control unit to trigger an attachment of the at least one device from the second list to the second central control unit.

2. The method according to claim 1, wherein the selecting step ii is carried out by receiving a user attachment instruction or a control message concerning an attachment of at least one home automation device to the first central control unit or the second control unit.

3. The method according to claim 2, wherein the attachment instruction corresponds to an order or an action on the at least one home automation device.

4. The method according to claim 2, wherein the attachment instruction is defined by an instruction communicated via a user interface of the user terminal or an application executed on the user terminal.

5. The method according to claim 4, wherein the instruction communicated via the user interface corresponds to a selection of a home automation device in the first list or the second list.

6. The method according to claim 1, wherein the selecting step ii is carried out depending on at least one selection criterion taking into account a relative location, a function comparison and/or communication quality between the at least one device from the first list and the first central control unit and the at least one device from the second list in connection and the second central control unit.

7. The method according to claim 6, wherein the first list and the second list are communicated in association with at least one descriptive information relating to a quality of communication between the at least one device from the first list and the first central control unit and the at least one device from the second list in connection and the second central control unit and/or an information concerning a function or a location of the at least one device from the first list and the at least one device from the second list, the at least one selection criterion being evaluated according to the at least one descriptive information.

8. The method according to claim 7, wherein the at least one selection criterion is evaluated by an approximation of the at least one descriptive information relating to the function or the location of the at least one device from the first list and the at least one device from the second list and an information defining the location or the function of the first central control unit and the second central control unit.

9. The method according to claim 7, wherein the at least one selection criterion is evaluated depending on a descriptive information relating to a quality of communication between the at least one device from the first list and the first central control unit and the at least one device from the second list and the second central control unit.

10. A computer program product comprising a non-transitory computer readable storage medium comprising code instructions to implement the method according to claim 1, the non-transitory computer readable storage medium being executed by a processor of the user terminal.

11. The method according to claim 8, wherein the at least one selection criterion is evaluated depending on a descriptive information relating to a quality of communication between the at least one device from the first list and the first central control unit and the at least one device from the second list and the second central control unit.

12. The computer program product according to claim 10, wherein the selecting step ii is carried out by receiving a user attachment instruction or a control message concerning an attachment of the at least one device from the first list to the first central control unit and the at least one device from the second list and the second central control unit.

13. The computer program product according to claim 12, wherein the attachment instruction corresponds to an order or an action on the at least one home automation device.

14. The computer program product according to claim 12, wherein the attachment instruction is defined by an instruction communicated via a user interface of the user terminal or an application executed on the user terminal.

15. The computer program product according to claim 14, wherein the instruction communicated via the user interface corresponds to a selection of at least one device from the first list and/or selection of at least one device from the second list.

16. The computer program product according to claim 10, wherein the selecting step ii is carried out depending on at least one selection criterion taking into account a relative location, a function comparison and/or communication quality between the at least one device from the first list and the first central control unit and the at least one device from the second list and the second central control unit.

17. The computer program product according to claim 16, wherein the first list and the second list are communicated in association with at least one descriptive information relating to a communication quality between the at least one device from the first list and the first central control unit and the at least one device from the second list and the second central control unit and/or an information concerning a function or a location of the at least one device from the first list and the at least one device from the second list, the at least one selection criterion being evaluated according to the at least one descriptive information.

18. The computer program product according to claim 17, wherein the at least one selection criterion is evaluated by an approximation of the at least one descriptive information relating to the function or the location of the at least one device from the first list and the at least one device from the second list and an information defining the location or the function of the first central control unit and the second central control unit.

* * * * *